United States Patent
Akka (10) Patent No.: US 9,027,122 B2
(45) Date of Patent: May 5, 2015

(54) ISOLATION TOOL FOR USER ASSISTANCE IN SOLVING A CAPTCHA TEST

(75) Inventor: Robert Aaron Akka, Sausalito, CA (US)

(73) Assignee: Yahoo! Inc., Sunnyvale, CA (US)

( * ) Notice: Subject to any disclaimer, the term of this patent is extended or adjusted under 35 U.S.C. 154(b) by 609 days.

(21) Appl. No.: 12/975,390

(22) Filed: Dec. 22, 2010

(65) Prior Publication Data
US 2012/0167204 A1  Jun. 28, 2012

(51) Int. Cl.
*G06F 21/00* (2013.01)
*G06F 21/36* (2013.01)

(52) U.S. Cl.
CPC .................................. *G06F 21/36* (2013.01)

(58) Field of Classification Search
CPC ................................ G06F 21/00; G06F 3/048
See application file for complete search history.

(56) References Cited

U.S. PATENT DOCUMENTS

| | | | |
|---|---|---|---|
| 2009/0077628 A1* | 3/2009 | Elson et al. | 726/2 |
| 2011/0029902 A1* | 2/2011 | Bailey | 715/764 |
| 2011/0292031 A1* | 12/2011 | Zhu et al. | 345/419 |

* cited by examiner

*Primary Examiner* — Jeffrey Pwu
*Assistant Examiner* — Nega Woldemariam
(74) *Attorney, Agent, or Firm* — James J. DeCarlo; Greenberg Traurig, LLP (57) ABSTRACT

A method includes displaying a CAPTCHA test comprising an image with distorted alphanumeric characters. The method also includes associating a mask with the image that maps the alphanumeric characters to coordinates. Further, the method includes, enhancing a portion of the image corresponding to one of the alphanumeric characters responsive to a user positioning an assistance tool proximate to one alphanumeric character to reduce distortion.

18 Claims, 8 Drawing Sheets

ISOLATION TOOL FOR USER ASSISTANCE IN SOLVING A CAPTCHA TEST

FIELD OF THE INVENTION

This invention relates generally, to computer security, and more specifically, to assisting a user with a CAPTHCA (Completely Automated Public Turing test to tell Computers and Humans Apart) challenge.

BACKGROUND

With the proliferation of unscrupulous activity on public networks, computer security has become a mandatory form of protection. Hackers seek to compromise online computer systems using a variety of techniques. Sometimes hackers operate manually to gain access to a system, which can be tedious for tasks such as attempting every possible password, or accessing every web page of a web site. More sophisticated hackers employ automated bots to perform these repetitive tasks. A bot is a computer software program that is configured to automatically perform one or more tasks over a computer network. For example, a bot can make millions of attempts to crack a password, or visit millions of web pages for the purpose of data scraping valuable database information without authorization.

In response, web sites can be configured with a CAPTHCA test. A CAPTCHA test is a form of challenge-response test that attempts to prevent bot from gaining access to a system. Generally, the authentication requires one party to question (challenge) and the other party to answer (response) correctly, prior to allowing access. Typically, the CAPTCHA test includes an image of distorted alphanumeric characters that, while recognizable by a human, should not be recognizable by a bot. The image may also be displayed upon a background. A user solving the test must be able to type the alphanumeric characters correctly. However, sometimes the CAPTCHA tests are too difficult for the user because of too many distortions or distortions that are too severe. Further, some users may lack the innate capacities of average sight and average cognitive abilities necessary to solve the CAPTCHA tests.

In light of the foregoing discussion, there is a need for a robust assistance for human users in solving the CAPTCHA test.

SUMMARY

The above-mentioned needs are met by a method, system, and computer program product for assisting users with CAPTCHA (Completely Automated Public Turing test to tell Computers and Humans Apart) tests.

An example of a method includes displaying a CAPTCHA test comprising an image with distorted alphanumeric characters. The method also includes associating a mask with the image that maps the alphanumeric characters to coordinates. Further, the method includes, enhancing a portion of the image corresponding to one of the alphanumeric characters responsive to a user positioning an assistance tool proximate to one alphanumeric character to reduce distortion.

An example of a computer program product includes displaying a CAPTCHA test comprising an image with distorted alphanumeric characters. The computer program product also includes associating a mask with the image that maps the alphanumeric characters to coordinates. Further the computer program product includes enhancing a portion of the image corresponding to one of the alphanumeric character responsive to a user positioning an assistance tool proximate to one alphanumeric character to reduce distortion.

An example of a system includes a generation module to generate a CAPTCHA test comprising distorted alphanumeric characters. The system also includes a mask associated with the CAPTCHA test that maps the alphanumeric characters to coordinates. Further, the system includes an assistance tool responsive to being positioned proximate to one of the alphanumeric characters, enhances a portion of the image corresponding to the one alphanumeric character to reduce distortion.

Advantageously, a human user is assisted in solving a CAPTCHA test, while security is maintained against access by bots.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

A method, system, and computer program product for assisting users with CAPTCHA (Completely Automated Public Turing test to tell Computers and Humans Apart) tests is disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
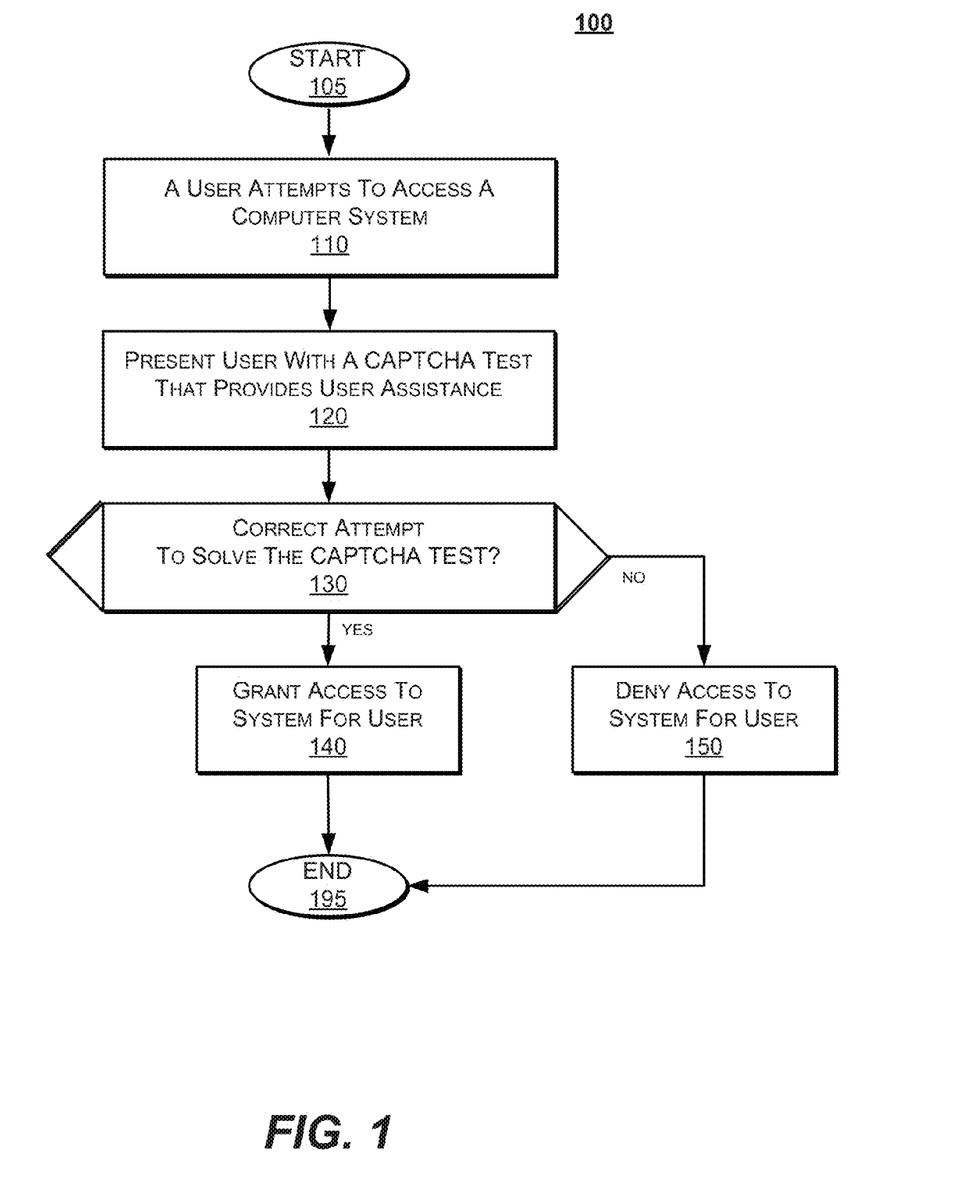
FIG. 1 is a flow diagram illustrating a method for using an assisted CAPTCHA (Completely Automated Public Turing test to tell Computers and Humans Apart) test for verification in accordance with one embodiment.

FIG. 1 is a flow diagram illustrating a method 100 for using an assisted CAPTCHA test for verification in accordance with one embodiment.

At step 110, a user attempts to access a computer system. For example, a computer user can access a web site over a computer network using a browser application. The web site can also be accessed directly from an application, such as a financial bookkeeping application accessing a bank web site. The user can access the web site from any type of computing device such as a PC (Personal Computer), a laptop computer, a tablet computer, a smart phone or PDA (Personal Desktop Assistant), a smart appliance, or any other processor-based device.

The user may further attempt to access a part of the web site that includes private information, such as financial data or personal e-mail messages (e.g., Yahoo! Mail). At this point, the user may be required to enter log-on credentials consisting of a user name and a password as verification.

At step 120, the user is presented with a CAPTCHA test that provides user assistance, for example, by reducing distortion to a selected portion of an image. In general, a user having difficulty solving a CAPTCHA can direct an assistance tool to enhance a character. The assistance tool is designed for human interaction in order to maintain the same level of computer security as the original CAPTCHA. Various embodiments can prevent a bot from being able to take advantage of the assistance. In other embodiments, assistance can be provided with an audio-based CAPTCHA test by reduction distortion to a selected portion of the audio.

In some embodiments, the CAPTCHA test can be designed to be more difficult that includes, even less perceptible by a bot, since human users can be assisted as needed. In other embodiments, the CAPTCHA test is activated for users with less than average sight or less than average cognitive abilities.

In some embodiments, the CAPTCHA test is displayed to all users prior to accessing a system. For example, the CAPTCHA test can appear along with log-on credentials. In other embodiments, the CAPTHA test is displayed upon suspicion that a user is a bot. The suspicion can be raised by, for example, multiple failed log-on attempts, sequential requests of web pages, or a high volume of requests from a single IP address over a short time period.

At step 130, an attempt to solve the CAPTCHA test is evaluated. In particular, a string of characters received from either a human user or bot are compared against the string of characters used to generate the CAPTCHA image. The characters can be entered using a traditional keyboard, a virtual keyboard, a dial pad a speech-to-text application, a motion detector, or any other type of computer input. More than one key may be depressed on a keyboard, for example, a modifier key for example, SHIFT, FUNCTION, CNTL or ALT in combination with another key. Additional embodiments are discussed in more detail below.

At step 140, responsive to a correct solution, access to the computer system is granted to the user. For example, a user may be allowed to enter log-on credentials, or be allowed to search a database. A user's Internet Protocol (IP) address may be stored and granted access for a certain amount of time without having to solve a new CAPTCHA test.

At step 150, responsive to an incorrect solution, access to the system is denied. In one implementation, the user can make another attempt to solve either the same CAPTCHA or a new one. In another implementation, the user is given a predefined number of attempts to solve the CAPTCHA. In yet another implementation, the user is immediately expelled from further access attempts. An IP address of the user is recorded and the user is locked out for a certain amount of time.

Figure 2:
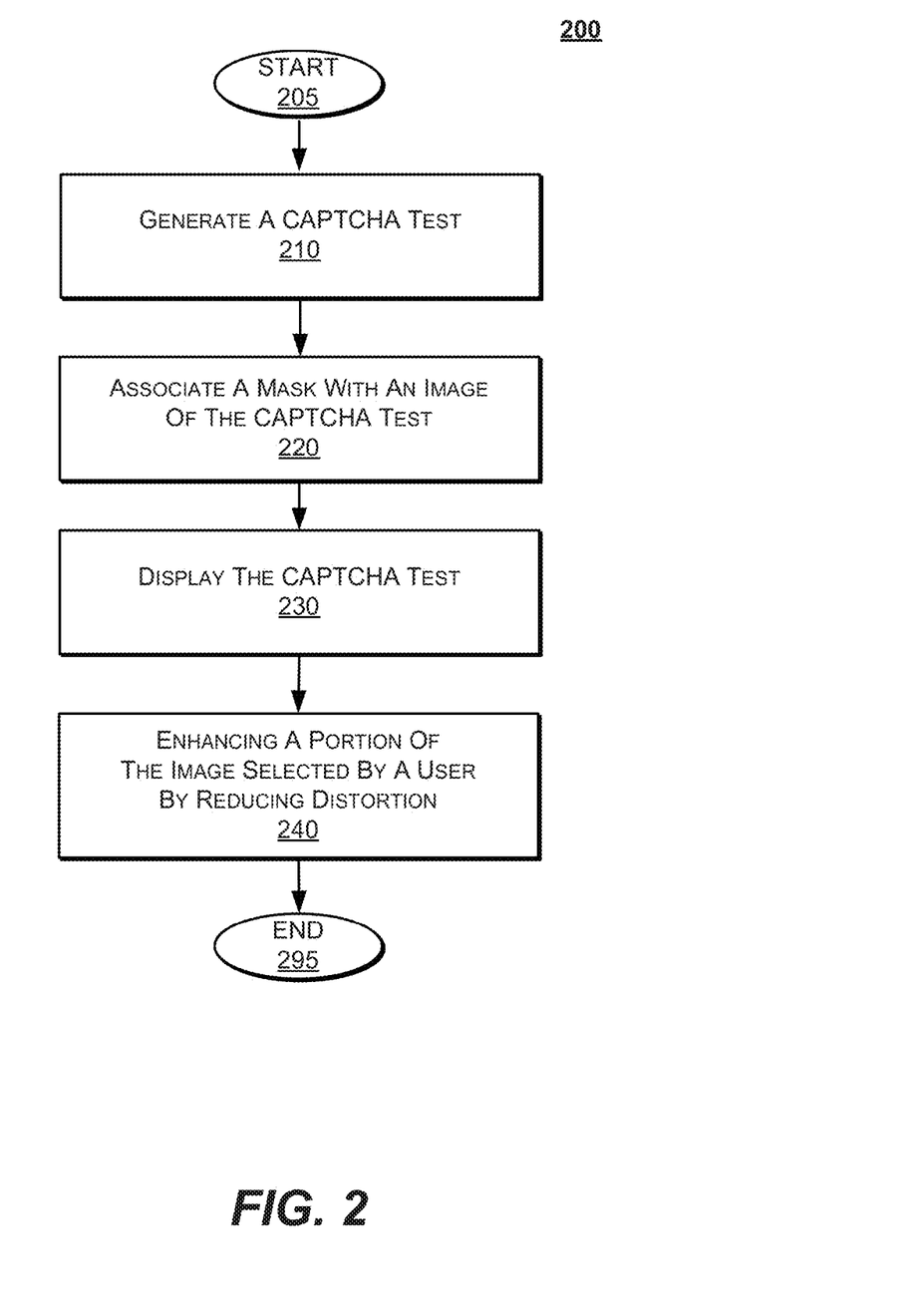
FIG. 2 is a flow diagram illustrating a method for assisting a user in solving a CAPTCHA tests in accordance with one embodiment.

FIG. 2 is a flow diagram illustrating a method 200 for assisting a user in solving a CAPTCHA tests in accordance with one embodiment. The method 200 is one example of step 120 of FIG. 1 discussed above.

At step 210, a CAPTCHA test is generated. The CAPTCHA test enhances computer security by ensuring that a human is accessing a computer system rather than an automated bot. To this end, the CAPTCHA test is designed to be perceivable by a human, but not by a computer program. As a form of challenge-response authentication, the CAPTCHA test is presented to a user. Access to a computer system is granted as a result of a correct response being returned.

One type of CAPTCHA test generated includes an image with distorted alphanumeric characters. The alphanumeric characters can be letters, numbers, symbols and any other characters appearing on a typical computer keyboard input. The letters can be small font or capitalized, corresponding to the English language that refers to Latin-based characters or a non-English language, for example, Chinese characters. For example, a pool of characters can be defined by the 128 characters of ASCII (American Standard Code for information Interchange). In another example, the pool of characters can be de defined by those that are easily entered from a keyboard without the use of shift, function or control keys. The characters can also be from any of hundreds of different types of fonts such as Times New Roman, Arial, Courier, Lucida, and the like.

The characters can be randomly generated to prevent any pattern recognition by a bot. The number of characters or words generated can be implementation-specific, for example, five characters. A CAPTCHA test may be viewed by some users as annoying, so a system designer weighs the needs for security against making the system too tedious for targeted users. Some embodiments can be designed to include a specific combination of character types. For example, the combination of letters with at least one number and/or at least one symbol can increase security. The combination can also include at least one capitalized letter. Another combination includes more than one type of font and/or more than one size. In one embodiment, actual words or phrases can be randomly generated, rather than a random group of characters.

The selected characters are represented as an image since characters represented in their inherent form are easily recognized by computers. A number of techniques can be used to distort the selected characters. First, the characters can be represented by a custom font that is not widely used. Each font has a unique visual representation of characters. Second, the characters can be spaced in an abnormal manner. Some fonts such as New Times Roman inherently space characters based on their natural appearance, while other fonts such as Courier inherently space characters evenly, regardless of their size. By changing the spacing between characters, a bot cannot automatically find the next characters by identifying the type of font. Some character spacing can be distorted more extremely by overlapping adjacent characters. Additionally, a size proportion of character can be altered by stretching or compressing a letter in the vertical and/or horizontal directions.

More advanced types of distortion include skewing characters to be angled in away from an anchor towards a vertical or horizontal direction (e.g., italicizing). Characters can be rotated clockwise or counter-clockwise, a 180 degree rotation resulting in an upside down character. Alternatively, characters can be flipped over a vertical axis to get a mirror representation, or flipped over a horizontal axis to get a pool reflection representation. Other graphical distortions include highlighting, underlining, strikethrough, and boldface. Many other types of distortions are possible.

A test image can also include a background to further confuse bots. One process for generating the CAPTCHA test is to use a background layer and a foreground layer of characters. The two layers are merged and exported as a single image file. A background can include elements such as lines and curves that make it difficult for a bot to even distinguish characters from the background. Also, the color and shading can mimic that of actual characters.

At step 220, a mask is associated with the image that maps the alphanumeric characters to coordinates. Each coordinate of an image either corresponds to a foreground character (or more than one character in areas of overlap) or to a part of a background. A graphical representation of a mask outlines each character. Coordinates within the outline are associated with a character. A tabular representation of a mask includes a table with rows of x-position and columns of y-positions. Each (x,y) coordinate is a cell of the table with an associated character. As a result, when a selection tool such as an icon is hovered over a particular location of an image with a mask (e.g., can be determined by a pixel location), an associated character can be identified. In other embodiments, a mask is not used.

At step 230, the CAPTCHA test is displayed. In one embodiment, a text box is displayed, along with a help button for directions, a refresh button to request a new CAPTCHA test, and an audio button to request an audio challenge. A test image can be output in any suitable lossy or lossless file format such as GIF (Graphics Interchange Format) or JPEG (Joint Photographic Experts Group) file, PNG (Portable Networks Graphic), and the like. In one embodiment, the CAPTCHA test is integrated within a web page. The web page can be composed in HyperText Markup Language (HTML), eXtensible Markup Language (XML), Hypertext Preprocessor (PHP), and include elements of Flash, Javascript, Java, Portable Document Format (PDF), and the like, any of which can include the CAPTCHA test. In another embodiment, the CAPTCHA test pops up in a dedicated window.

At step 240, a portion of the image selected by a user is enhanced to reduce distortion. The user can maneuver a tool to a portion that is perhaps so heavily distorted that it is unrecognizable. Afterwards, the user is able to enter a string of characters as a solution to the CAPTCHA test. In another embodiment, a character is isolated for better recognition, without reducing distortion. Further details are discussed below with respect to FIG. 3.

Figure 3:
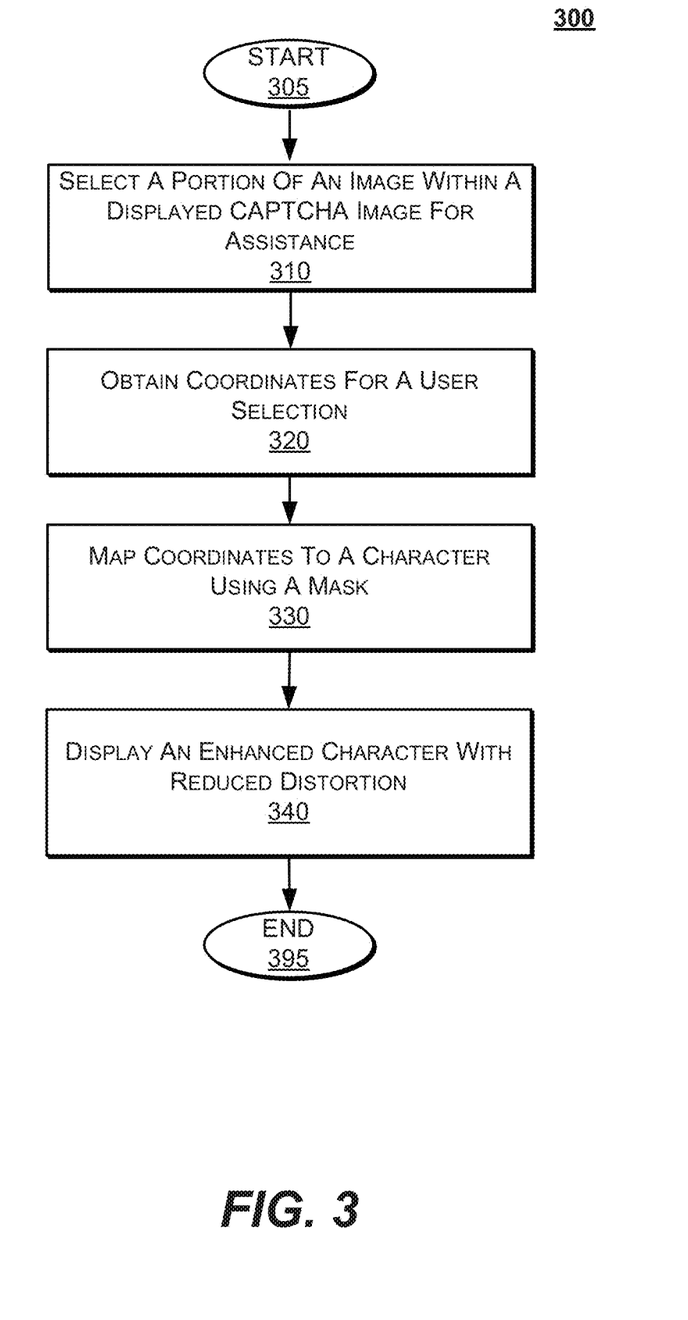
FIG. 3 is a flow chart illustrating an exemplary method for enhancing a character of a CAPTHCA test responsive to a user selection according to one embodiment.

FIG. 3 is a flow chart illustrating an exemplary method 300 for enhancing a character of a CAPTCHA test responsive to a user selection according to one embodiment. The method 300 is one exemplary implementation of step 240 of FIG. 2 discussed above.

At step 310, a user selects a portion of the image within the displayed CAPTCHA image for assistance. A CAPTCHA image is interactive. In one embodiment, when a user hovers over the image, a cursor appears as a selection tool. In particular, a portion of the image is intermittently selected by pressing a mouse button at a certain location on the image. Alternatively, a portion of the image can be continuously selected by merely moving the selection tool around the image. In a touch screen environment, a user finger guides the selection tool.

At step 320, coordinates for the user selection are obtained. In one embodiment, the coordinates of a cursor are sent to a CAPTCHA application which may then have to be translated to local application coordinates. In other words, each application window has its own local coordinates. The initial OS coordinates can be global coordinates that locate a pointer relative to an entire display which can include several windows, while local coordinates can be relative to an individual application display within a particular widow.

At step 330, the coordinates are mapped to a character using the mask. A coordinate table referred to above is accessed from cache. The x and y location coordinates identify a cell in the table. The cell will contain either a particular character or an indication of a miss when no character is associated with the locations.

At step 340, the enhanced character is displayed with reduced distortion. In one embodiment, the character is displayed without any distortion. Distortions are removed from both the foreground and the background. The enhanced character can be displayed within the same tool used for selection. Alternatively, the enhanced character can be displayed at a random location on the image to prevent a bot from being programmed to receive assistance at a predefined location.

In another embodiment, the character is displayed with some distortions remaining. For example, if a character has been overlapped, skewed and rotated, the enhanced character can be displayed without overlap and skew, but rotated. To do so, a list of initial distortions is cached when the image is generated. The enhanced character is then recreated without the complete list of distortions being applied. Also, the same distortions can be applied to a lesser degree for example less noise in the background.

In still another embodiment, background distortions are removed without altering the character itself. Because the background distortions can degrade boundaries that define the character, merely removing the background can allow a human to more easily discern the character.

In yet another embodiment, a selected portion of the image is magnified.

Figure 4A:
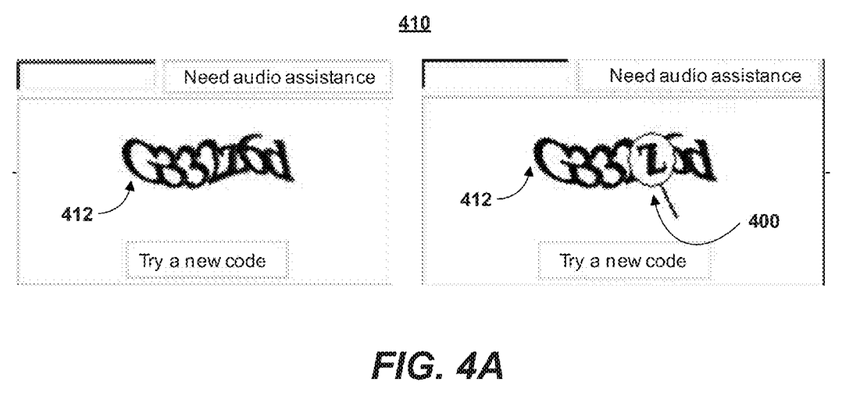
FIG. 4A and FIG. 4B are schematic diagrams illustrating assistance tools according to an embodiment.
Figure 4B:
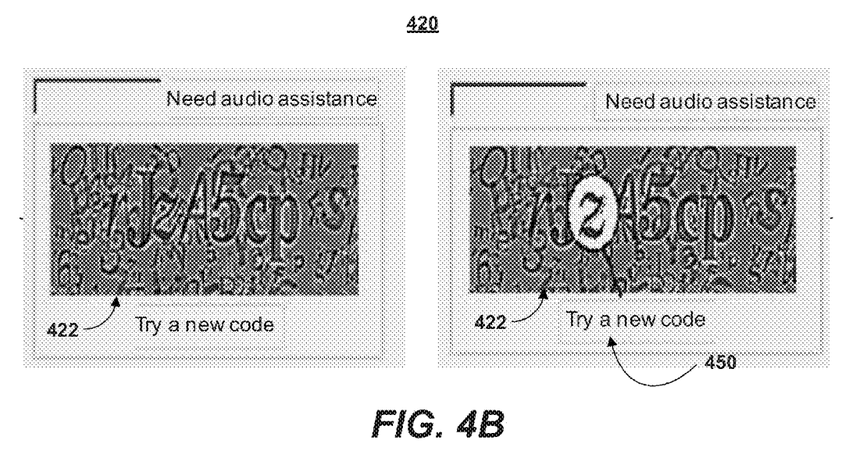

FIG. 4A and FIG. 4B are schematic diagrams illustrating assistance tools according to an embodiment. More specifically, CAPTCHA test 410 shows an example of distorted characters 412. The characters themselves include a combination of small and large font, and alphabetic and numerical characters. Spacing between the characters has been eliminated so that the boundaries of each character abut adjacent characters. Furthermore, a horizontal plane defining a bottom boundary of the characters has been converted to a waving plane.

An assistance tool 400 is shown hovering over one of the characters. Within the perimeter of the assistance tool 400, abutting characters have been removed, while the wavy lower boundary remains. In isolation, a user can more readily identify the enhanced character as the letter "z" in small font.

CAPTCHA test 420 also shows an example of distorted characters 422 in the foreground, along with background distortions. The background distortions of this example include other characters randomly spaced and rotated.

An assistance tool 450 is shown here hovering again over the letter "z". However, in this case, the background distortions have been removed.

In other embodiments, assistant tools can have different shapes, such as circular, oval, square, etc. Also, various distortions can be removed within a perimeter of an assistance tools. Some distortions can remain to prevent a bot from being programmed specifically for the CAPTCHA test described herein.

Figure 5:
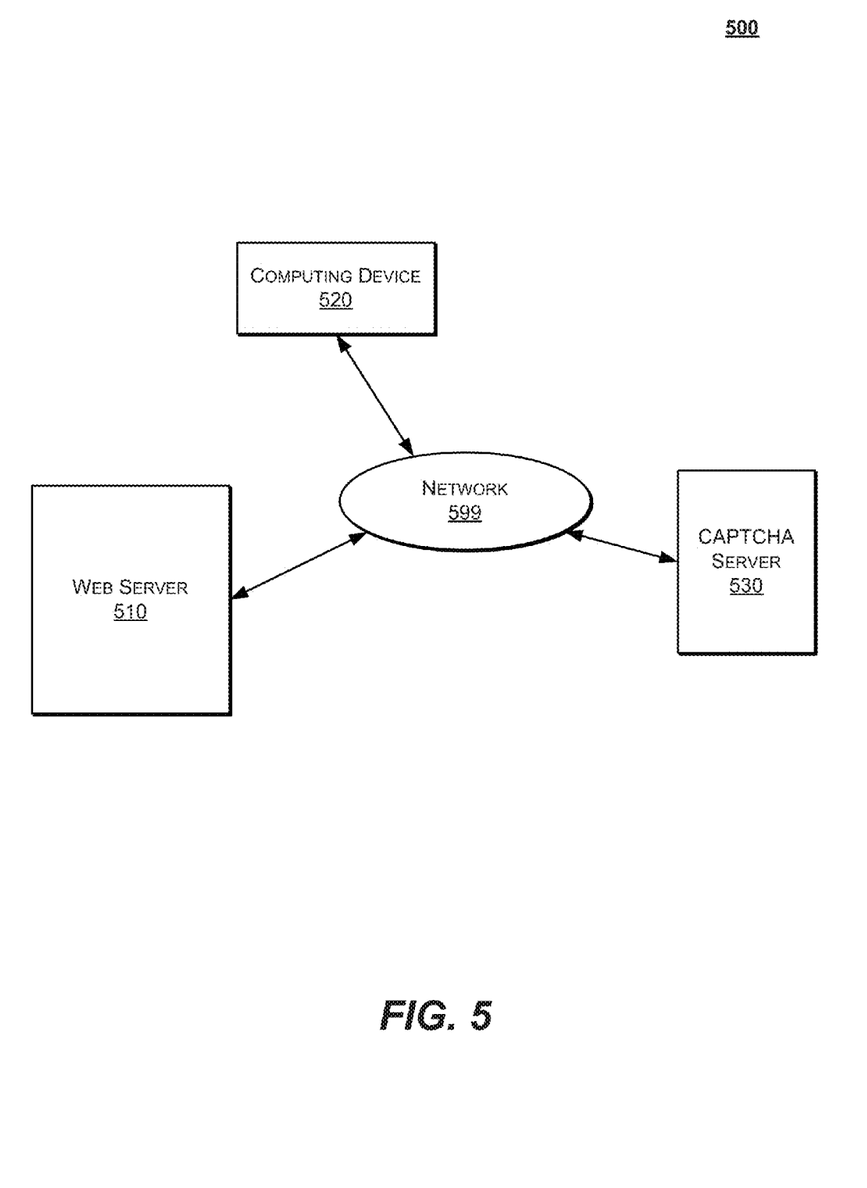
FIG. 5 is a block diagram illustrating a system for assisting a user in solving a CAPTCHA test according to an embodiment.

FIG. 5 is a block diagram illustrating a system 500 for assisting a user in solving a CAPTCHA test according to an embodiment. The system 500 includes a web server 510, a computing device 520, and a CAPTCHA server 530, coupled in communication through a network 599.

The web server 510 can be, for example, a PC, a laptop, a server blade, or any other computing device. In one embodiment the web server 510 stores web sites and/or web applications. Responsive to requests from the computing device 520 and other clients to retrieve web pages and/or web applications, the web server 510 sends web pages and other data across the network 599, conditioned upon satisfying a CAPTCHA test. In one implementation, a Java component of an HTML encoded web page contact the CAPTCHA server 530 for a randomly generated CAPTCHA image, which is integrated in the HTML web page returned to the computing device 520.

The computing device 520 can be, for example, a PC, a stationary computing device, a laptop or notebook computer, a tablet computer, a smart phone or PDA, a smart appliance, or any other suitable processor-based device. In one embodiment, the computing device 520 accesses a web site or application on the web server 530. The computing device 520 displays a CAPTCHA test to a user as needed for access. Additional embodiments of the computing device 520 are described in more detail below.

The CAPTCHA server 530 can be any of the above processor-based devices. When the computing device 520 requests access to a web site, a web application, or other sensitive data, the CAPTCHA server 530 can receive a request from the web server 510 for a CAPTCHA test. After sending the CATPCHA test and receiving an attempted solution, the CAPTCHA server 530 sends a solution correct or solution incorrect indication to the web server 510. Additional embodiments of the CAPTCHA server 530 are described in more detail below.

Figure 6:
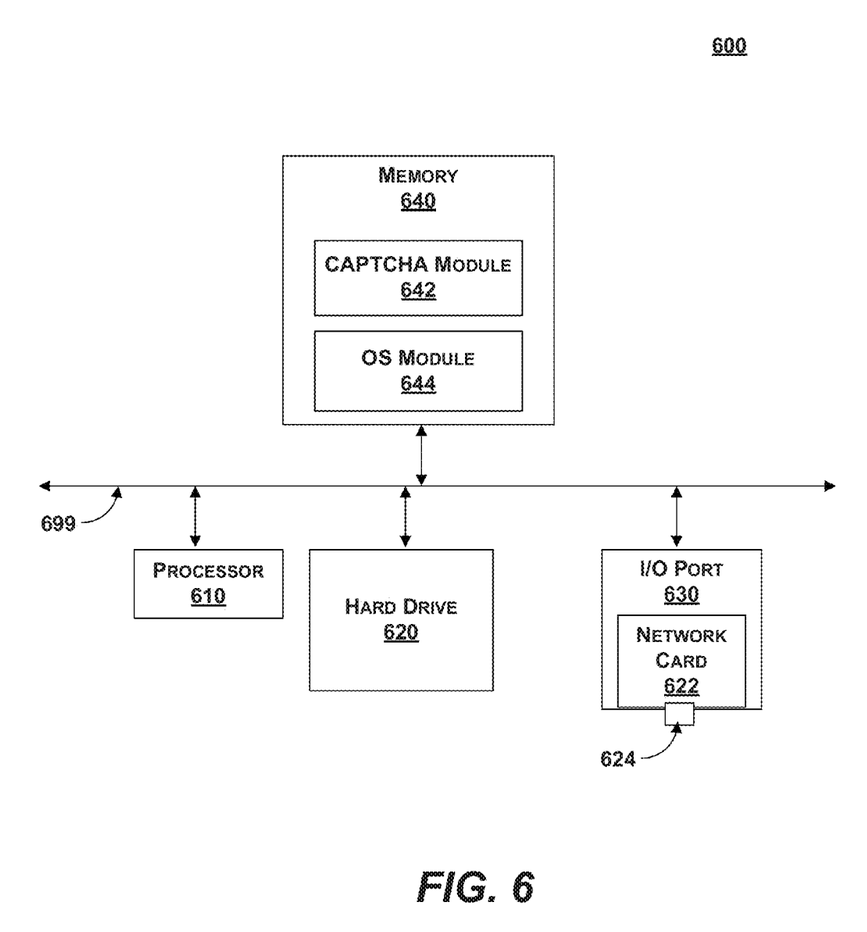
FIG. 6 is a block diagram illustrating a CAPTCHA server according to an embodiment.

FIG. 6 is a block diagram illustrating a CAPTCHA server 600 according to an embodiment. The server 600 is an exemplary implementation of the server 510 of FIG. 5. The server 600 includes a processor 610, a hard drive 620, an I/O port 630, and a memory 640 coupled by a bus 699. In the present embodiment, the CAPTCHA server 600 is dedicated to CAPTCHA testing in order to provide a high quality of service for a high volume of requests. However, in other embodiments, the CAPTCHA server 600 can be incorporated into a general web server or application server.

The processor 610 can be a general purpose processor, an application-specific integrated circuit (ASIC), a Field Programmable Gate Array (FPGA), a Reduced Instruction Set Controller processor (RISC), an integrated circuit, or the like. There can be a single core, multiple cores, or more than one processor. In one embodiment, the processor 610 is specially suited for the processing demands of CAPTCHA tests and/or network processing for example, custom micro-code, instruction fetching, pipelining or cache sizes). The processor 610 can be disposed on silicon or any other suitable material. In operation, the processor 610 can receive and execute instructions and data stored in the memory 640 or the hard drive 620. The hard drive 620 can be a platter-based storage device, a flash drive, an external drive, a persistent memory device, or any other type of memory.

The hard drive 620 provides persistent (i.e., long term) storage for instructions and data. The I/O port 620 is an input/output panel including a network card 622. The network card 622 can be, for example, a wired networking card for example, a USB card, or an IEEE 802.3 card, a wireless networking card for example, an IEEE 802.11 card, or a Bluetooth card, a cellular networking card for example, a 3G card. An interface 624 is configured according to networking compatibility. For example, a wired networking card includes a physical port to plug in a cord, and a wireless networking card includes an antennae. The network card 622 provides access to a communication channel on a network.

The memory 640 can be a Random Access Memory (RAM), a flash memory, a non-persistent memory device, or any other device capable of storing program instructions being executed. The memory 640 further comprises a CAPTCHA module 642, and an operating system (OS) module 644. The OS module 644 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

Figure 7:
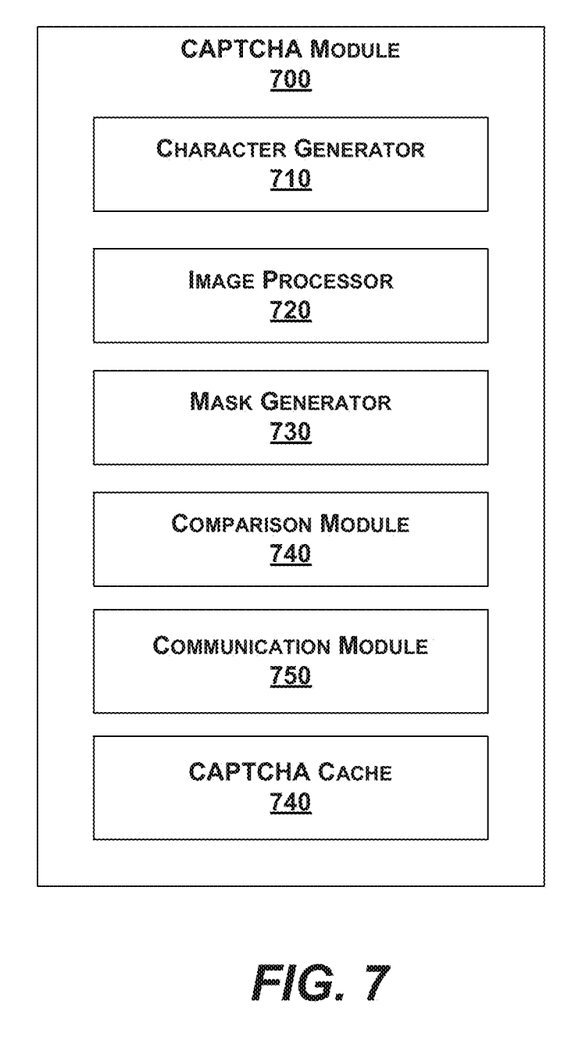
FIG. 7 is a block diagram illustrating a CAPTCHA module according to an embodiment.

FIG. 7 is a block diagram illustrating a CAPTCHA module 700 according to an embodiment. The CAPTCHA module 700 is an exemplary implementation of the CAPTCHA module 642 of FIG. 6. The CAPTCHA module 700 includes a random character generator 710, an image processor 720, a mask generator 730, a comparison module 740, a client communication module 750 and a CAPTCHA cache 760. The components can communicate with each other through, for example, APIs (Application Programming Interfaces). In other embodiments, all or parts of the components can be implemented in hardware or benefit from special hardware accelerators.

The random character generator 710 generates a string of alphanumeric characters for a CAPTCHA test. The image processor 720 distorts the string of characters and generates an image. Moreover, the image processor 720 can produce enhanced characters with reduced distortion. The mask generator 730 maps the characters of the image to coordinates. The comparison module 740 receives the character string and an attempted solution of the characters string submitted by a user to determine if there is a match. The client communication module 750 manages network connections to clients and request to provide CAPTCHA testing. The CAPTCHA cache 760 can be use by the other components to temporarily store data, such as the character string, the character map, and attempted CAPTCHA solutions.

Figure 8:
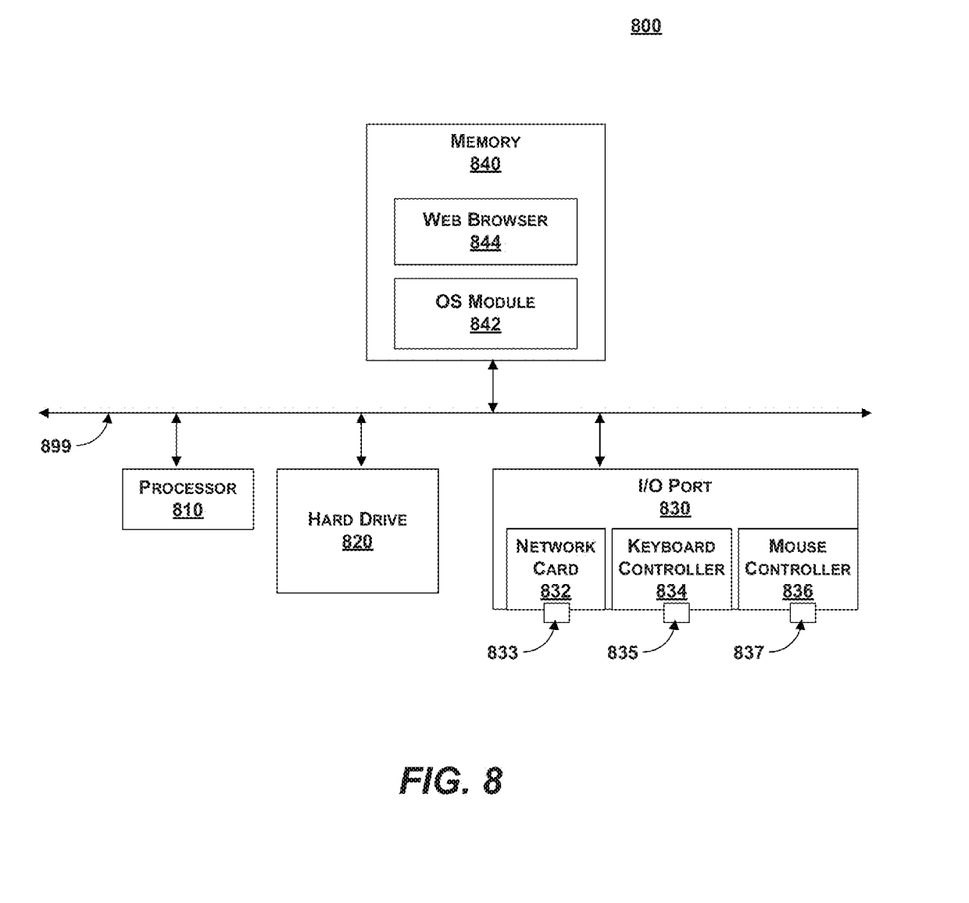
FIG. 8 is a block diagram illustrating a computing device according to an embodiment.

FIG. 8 is a block diagram illustrating a computing device 800 according to an embodiment. The computing device 800 is an exemplary implementation of the computing device 520 of FIG. 5.

The computing device 800 includes a processor 810, a hard drive 820, an I/O port 830, and a memory 840, coupled by a bus 899. The processor 810 and the hard drive 820 can be configured as described above with respect to FIG. 6.

The I/O port 830 comprises a network card 832 with a physical port 833, as described above, along with a keyboard controller 834 and a mouse controller 836. The keyboard controller 834 can be coupled to a physical port 835 (e.g., PS/2 or USB port) for connecting a keyboard. The keyboard can be a standard alphanumeric keyboard with 101 or 104 keys (including alphabetic, numerical and punctuation keys, a space bar, modifier keys, etc.), a laptop or notebook keyboard, a thumb-sized keyboard, a virtual keyboard, or the like. The mouse controller 836 can also be coupled to a physical port 837 (e.g., mouse or USB port).

The memory 840 comprises an OS module 842, as described above, along with a web browser 844. In other embodiments, the memory 840 comprises an application, such a banking application, that implements CAPTCHA testing. The web browser can be a desktop web browser (e.g., Internet Explorer, Mozilla, or Chrome), a mobile browser, or a web viewer built integrated into an application program. In an embodiment, a user accesses a system on the World Wide Web (WWW) through a network such as the Internet. The web browser 844 is used to download web pages or other content in various formats including HTML, XML, text, PDF, and postscript, and may be used to upload information to other parts of the system. The Web browser may use URLs (Uniform Resource Locators) to identify resources on the web and HTTP (HyperText Transfer Protocol) in transferring files on the web.

As described herein, computer software products may be written in any of various suitable programming languages, such as C, C++, C#, Pascal, Fortran, Perl, Matlab (from Math-Works), SAS, SPSS, JavaScript, AJAX, and Java. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems). Many of the functionalities described herein can be implemented in computer software, computer hardware, or a combination.

Furthermore, the computer that is running the previously mentioned computer software may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method, comprising:
    communicating for display, via a computing device, a Completely Automated Public Turing test to tell Computers and Humans Apart (CAPTCHA) test comprising an image with distorted alphanumeric characters; and
    responsive to a user positioning an assistance tool proximate to one of the alphanumeric characters, isolating, via the computing device, a view of the image corresponding to the one alphanumeric character by enhancing only a portion of the image corresponding to the one alphanumeric character to reduce distortion without enhancing other alphanumeric characters of the image, said enhancing only a portion of the image comprising reducing a severity of distortion of the portion of the image isolated by the assistance tool, wherein reducing the severity of distortion includes at least one of removing distortion from the foreground, removing distortion from the background, communicating for display the one alphanumeric character at a random location on the image, communicating for display the one alphanumeric character without overlap and skew but rotated, and applying distortions to a lesser degree.

2. The method of claim 1, wherein the alphanumeric characters of the image are distorted to be unrecognizable by an automated bot while remaining recognizable by a human user.

3. The method of claim 1 further comprising:
    associating a mask with the image that maps the alphanumeric characters to coordinates,
    wherein responsive to the user positioning the assistance tool proximate to one of the alphanumeric characters comprises isolation responsive to the user positioning the assistance tool proximate to coordinates of one of the alphanumeric characters, enhancing a portion of the image corresponding to the one alphanumeric character by removing abutting characters to reduce distortion.

4. The method of claim 1, wherein reducing a severity of distortion comprises at least one of: reducing or increasing abnormal contrast, removing or adding shading, removing or adding an outline, whiting out surroundings, and deemphasizing abutting or overlapped alphanumeric or other characters.

5. The method of claim 1 further comprising:
    recognizing an attempt by an automatic bot to solve the CAPTCHA test using the enhanced portion of the image; and
    setting a flag indicative of an attempted security breach.

6. The method of claim 1 further comprising:
    generating the CAPTCHA test;

receiving a string of alphanumeric characters from an attempt to solve the CAPTCHA test; and allowing access beyond the CAPTCHA test responsive to the alphanumeric characters of the attempt to solve matching the alphanumeric characters of the image.

7. A non-transitory computer-readable storage medium tangibly encoded with computer-executable instructions, that when executed by a processor associated with a computing device, performs a method comprising:

communicating for display displaying a Completely Automated Public Turing test to tell Computers and Humans Apart (CAPTCHA) test comprising an image with distorted alphanumeric characters; and responsive to a user positioning an assistance tool proximate to one of the alphanumeric characters, isolating a view of the image corresponding to the one alphanumeric character by enhancing only a portion of the image corresponding to the one alphanumeric character to reduce distortion without enhancing other alphanumeric characters of the image, said enhancing only a portion of the image comprising reducing a severity of distortion of the portion of the image isolated by the assistance tool, wherein reducing the severity of distortion includes at least one of removing distortion from the foreground, removing distortion from the background, communicating for display the one alphanumeric character at a random location on the image, communicating for display the one alphanumeric character without overlap and skew but rotated, and applying distortions to a lesser degree.

8. The non-transitory computer-readable storage medium of claim 7, wherein the alphanumeric characters of the image are distorted to be unrecognizable by an automated bot while remaining recognizable by a human user.

9. The non-transitory computer-readable storage medium of claim 7 further comprising:

associating a mask with the image that maps the alphanumeric characters to coordinates, wherein responsive to the user positioning the assistance tool proximate to one of the alphanumeric characters comprises isolation responsive to the user positioning the assistance tool proximate to coordinates of one of the alphanumeric characters, enhancing a portion of the image corresponding to the one alphanumeric character by removing abutting characters to reduce distortion.

10. The non-transitory computer-readable storage medium of claim 7, wherein reducing a severity of distortion comprises at least one of: reducing or increasing abnormal contrast, removing or adding shading, removing or adding an outline, whiting out surroundings, and deemphasizing abutting or overlapped alphanumeric or other characters.

11. The non-transitory computer readable storage medium of claim 7 further comprising:

recognizing an attempt by an automatic bot to solve the CAPTHCA test using the enhanced portion of the image; and setting a flag indicative of an attempted security breach.

12. The non-transitory computer-readable storage medium of claim 7 further comprising:

generating the CAPTCHA test;

receiving a string of alphanumeric characters from an attempt to solve the CAPTCHA test; and allowing access beyond the CAPTCHA test responsive to the alphanumeric characters of the attempt to solve matching the alphanumeric characters of the image.

13. A system comprising:

a processor;

a non-transitory computer-readable storage medium for tangibly storing thereon program logic for execution by the processor, the program logic comprising:

generation logic executed by a processor for generating a Completely Automated Public Turing test to tell Computers and Humans Apart (CAPTCHA) test comprising distorted alphanumeric characters; and isolation logic executed by the processor for isolating, responsive to an assistance tool being positioned proximate to one of the alphanumeric characters, a view of the image corresponding to the one alphanumeric character by enhancing only the portion of the image corresponding to the one alphanumeric character to reduce distortion without enhancing other alphanumeric characters of the image, said enhancing only a portion of the image comprising reducing a severity of distortion of the portion of the image isolated by the assistance tool, wherein reducing the severity of distortion includes at least one of removing distortion from the foreground, removing distortion from the background, communicating for display the one alphanumeric character at a random location on the image, communicating for display the one alphanumeric character without overlap and skew but rotated, and applying distortions to a lesser degree.

14. The system of claim 13, wherein the alphanumeric characters of the CAPTCHA test are distorted to be unrecognizable by an automated bot while remaining recognizable by a human user.

15. The system of claim 13, further comprising:

association logic executed by the processor for associating a mask with the CAPTCHA test that maps the alphanumeric characters to coordinates, wherein the assistance tool enhances a portion of the image corresponding to the one alphanumeric character by removing abutting characters to reduce distortion.

16. The system of claim 13, wherein the assistance tool reduces a severity of distortion comprising at least one of: reducing or increasing abnormal contrast, removing or adding shading, removing or adding an outline, whiting out surroundings, and deemphasizing abutting or overlapped alphanumeric or other characters.

17. The system of claim 13 further comprising:

recognition logic executed by a processor for recognizing an attempt by an automatic bot to solve the CAPTCHA test using the enhanced portion of the image, and set a flag indicative of an attempted security breach.

18. The system of claim 13 further comprising:

receiving logic executed by a processor for receiving a string of alphanumeric characters from an attempt to solve the CAPTCHA test, and allowing access beyond the CAPTCHA test responsive to the alphanumeric characters of the attempt to solve matching the alphanumeric characters of the image.

\* \* \* \* \*